Patented June 6, 1939

2,161,741

UNITED STATES PATENT OFFICE 2,161,741

MANUFACTURE OF MERCAPTOTHIAZOLES

John R. Gage, Akron, Ohio, assignor to Wingfoot Corporation, Wilmington, Del., a corporation of Delaware No Drawing. Application May 27, 1937, Serial No. 145,155

5 Claims. (Cl. 260—306)

This invention relates to the preparation of mercaptothiazoles. More particularly it relates to a method of purifying mercapto aryl thiazoles and thus rendering the crude product more suitable for use.

The mercapto aryl thiazoles, particularly as exemplified by the 2-mercaptobenzothiazoles, have been found to be very useful as dyestuff intermediates, pharmaceuticals, and accelerators of the vulcanization of rubber. A number of processes have been developed for the preparation of these compounds. Generally speaking, it is necessary to take the product as originally obtained by these processes and submit it to some purification treatment in order to put the material in satisfactory form for commercial use. One method of purification in leading use at the present time involves solution of the crude mercaptoarylthiazole in aqueous sodium hydroxide, separation of the solution from the insoluble impurities by decantation or otherwise, and precipitation of the purified product by the addition of acid, such as sulfuric or hydrochloric.

It has now been discovered that mercaptoarylthiazoles can generally be very readily purified by dissolving them in ammonium hydroxide, separating the resultant solution from the insoluble impurities, and then evaporating off the ammonia, together with some water, to precipitate the mercapto arylthiazole in a purified condition. The reaction is illustrated by the equation

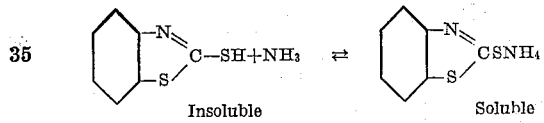

In addition it is found that this process of purification yields a product which is dense and definitely crystalline in character and possesses physical characteristics which cause it to dry, pulverize, and sift in much better fashion than does the product as ordinarily obtained.

At the present time the process most generally used for the production of mercaptoarylthiazoles is that described in U. S. Patent 1,631,871 to Kelly. It was found that, when a product prepared by this process and having a purity of 89% was subjected to the purification process according to the present invention, a product was consistently obtained after one treatment having a purity of better than 95% and often as high as 97½%.

The first step of the process consists in treating the crude product with ammonium hydroxide to dissolve the mercaptoarylthiazole. The insoluble impurities are then separated by any of the usual methods, settling and decantation having been found to work extremely well. The solution, thus obtained, is then treated, as by heating or evacuation or a combination of the two, to drive off ammonia, the purified mercapto aryl thiazole progressively precipitating as the ammonia is expelled from the solution. The removal of ammonia and attendant precipitation of the mercaptoarylthiazole may be carried to any point desired. In practice it is not absolutely necessary to completely recover all of the mercaptoarylthiazole inasmuch as the liquor removed after the separation may be utilized for preparing the next batch of solution to the end that any mercaptoarylthiazole remaining in the mother liquor after the evaporation of ammonia is not lost but is recirculated in the system. In a similar fashion, the ammonia removed from the solution may be absorbed in fresh water or in mother liquor and reused. Thus, it is obvious that the process can be operated in a very economical manner, the only materials costs being those attributable to the incidental losses occurring in the process. Also, the insoluble impurities consisting largely of unconverted or partially converted raw materials used in the production of the mercaptoarylthiazole, are uncontaminated by added reagents so that they may be advantageously re-used in the preparation of more mercaptoaryl thiazole.

The concentration and quantity of ammonium hydroxide employed may be greatly varied without substantially altering the efficacy of the process. The following table indicates how these factors may be varied without greatly detracting from the purifying effect of the treatment. In each case 10 grams of crude pellets which contained 45–55% moisture and analyzed 89.3% mercapto arylthiazole on a dry basis were treated.

| Liquor | Batch | Yield | Purity | Extraction range |
|---|---|---|---|---|
| | Gram-pellets | Grams | Percent | °C. |
| 20 cc. NH₄OH, 80 cc. water | 10 | 3.90 | 95.6 | 88-95 |
| 40 cc. NH₄OH, 60 cc. water | 10 | 3.55 | 95.6 | 75-95 |
| 80 cc. NH₄OH, 20 cc. water | 10 | 3.25 | 96.0 | 61-90 |
| 20 cc. NH₄OH, 80 cc. water | 10 | 3.65 | 97.6 | 95 |
| 40 cc. NH₄OH, 60 cc. water | 10 | 4.55 | 97.3 | 85-95 |
| 80 cc. NH₄OH, 20 cc. water | 10 | 4.35 | 97.0 | 71-90 |
| 20 cc. NH₄OH, 80 cc. water | 10 | 3.25 | 96.6 | 75.96 |
| 40 cc. NH₄OH, 60 cc. water | 10 | 2.25 | 96.3 | 92-95 |
| 80 cc. NH₄OH, 20 cc. water | 10 | 1.75 | 96.0 | 84-95 |

It thus appears that both the concentration and quantity of ammonia may be greatly varied without substantially affecting the purification obtained. The quantities of ammonia and its concentration may, therefore, in practice be established by economic and other practical considerations without greatly affecting the efficiency of the process.

Table 2, following, demonstrates the progressive precipitation of the mercaptoarylthiazole on distillation of the solution to drive off ammonia. Forty grams of 2-mercaptobenzothiazole, containing 55% moisture and of 89.3% purity on a dry basis, were treated with 320 cc. of mother liquor (from a previous batch) containing 1% ammonia and saturated with 2-mercapto-benzothiazole, and 80 cc. of ammonium hydroxide containing 27% NH$_3$. The insoluble impurities were allowed to settle and the clear liquid was decanted off. This was then heated to drive off the ammonia and the following results were obtained:

| Vol. difference | Total yield | Purity | Yield/cc. evap. |
|---|---|---|---|
| | Grams | Percent | Grams |
| 400-300 cc | 21.85 | 96.0 | 0.2185 |
| 300-224 cc | 31.45 | 97.0 | 0.1786 |
| 224-153 cc | 38.05 | 98.0 | 0.1540 |
| 153-85 cc | 41.15 | 97.3 | 0.1305 |
| 85-20 cc | 41.95 | | 0.1105 |

The following experiment and data further demonstrate the practice of invention. Fifty grams of 2-mercaptobenzothiazole of 89.3% purity were dissolved in 100 cc. of mother liquor containing 2.88% of 2-mercaptobenzothiazole and 100 cc. of ammonium hydroxide containing 27% NH$_3$. The insoluble impurities were allowed to settle and the clear liquid was drawn off. This solution was then evaporated to yield 43.75 grams of 96% pure 2-mercaptobenzothiazole. The 54 cc. of residual mother liquor contained by analysis 3.15 grams of 2-mercaptobenzothiazole.

While the process of the invention is particularly applicable to the treatment of the crude product obtained by the process of U. S. Patent 1,631,871 to Kelly it may also be applied to the purification of a crude mercaptoarylthiazole obtained by any other method. A purification will be effected in any case in which there are present in the crude product impurities insoluble in ammonium hydroxide. From an economic standpoint it will be desirable to recover the ammonia distilled off and recirculate the mother liquor remaining after the distillation. The concentrations and temperatures and methods of separation of the solution and impurities may be varied greatly according to the design and desire of the user.

Although only the preferred forms of the invention have been described in detail, it will be apparent to those skilled in the art that various modifications may be made therein without departing from the spirit of the invention or the scope of the appended claims in which it is intended to claim all of patentable novelty residing in the invention.

I claim:

1. A method of purifying mercaptoarylthiazoles which comprises treating the crude mercaptoarylthiazole with ammonium hydroxide, decanting the resulting solution from the insoluble impurities, and heating the said solution to volatilize the ammonia and recover the purified mercaptoarylthiazole.

2. A method of purifying mercaptoarylthiazoles which comprises removing the mercaptoarylthiazole from the insoluble impurities by solution in ammonium hydroxide and heating the resulting solution to volatilize the ammonia and precipitate the mercaptoarylthiazole.

3. In the process of preparing a mercaptoarylthiazole from sulfur, carbon disulfide and a primary aromatic amine having a free ortho position, the step which comprises removing the mercaptoarylthiazole from the insoluble impurities by solution in ammonium hydroxide and heating the resulting solution to volatilize the ammonia and precipitate the mercaptoarylthiazole.

4. In the process of preparing 2-mercaptobenzothiazole from sulfur, carbon disulfide, and aniline, the step which comprises removing the 2-mercaptobenzothiazole from the insoluble impurities by solution in ammonium hydroxide and heating the resulting solution to volatilize the ammonia and precipitate the 2-mercaptobenzothiazole.

5. A method of purifying mercaptoarylthiazoles which comprises treating the crude mercaptoarylthiazole with ammonium hydroxide, separating the resultant solution from the insoluble impurities, heating the said solution to volatilize the ammonia and precipitate the mercaptoarylthiazole, separating the precipitated mercaptoarylthiazole from the mother liquor, recovering the volatilized ammonia, and utilizing the mother liquor and recovered ammonia in the treatment of the next portion of crude mercaptoarylthiazole.

JOHN R. GAGE.